(12) United States Patent
Citelli

(10) Patent No.: US 8,990,015 B2
(45) Date of Patent: Mar. 24, 2015

(54) METHOD FOR COURSE PREDICTION IN DRIVER ASSISTANCE SYSTEMS FOR MOTOR VEHICLES

(75) Inventor: Silvia Citelli, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 2342 days.

(21) Appl. No.: 11/795,114

(22) PCT Filed: Jan. 12, 2006

(86) PCT No.: PCT/EP2006/050184
§ 371 (c)(1),
(2), (4) Date: Mar. 11, 2008

(87) PCT Pub. No.: WO2006/077194
PCT Pub. Date: Jul. 27, 2006

(65) Prior Publication Data
US 2008/0270018 A1    Oct. 30, 2008

(30) Foreign Application Priority Data
Jan. 24, 2005   (DE) .......................... 10 2005 003 192

(51) Int. Cl.
| | |
|---|---|
| G08G 1/123 | (2006.01) |
| G06F 17/10 | (2006.01) |
| G06G 7/78 | (2006.01) |
| G08G 1/16 | (2006.01) |
| B60K 31/00 | (2006.01) |
| B60W 30/14 | (2006.01) |
| B60W 30/16 | (2012.01) |
| B60W 40/02 | (2006.01) |
| B60W 30/09 | (2012.01) |
| B60W 50/00 | (2006.01) |
| B60W 30/095 | (2012.01) |

(52) U.S. Cl.
CPC ............ *B60W 40/02* (2013.01); *B60K 31/0008* (2013.01); *B60W 30/146* (2013.01); *B60W 30/09* (2013.01); *Y02T 10/84* (2013.01); *B60K 31/0058* (2013.01); *B60W 2550/402* (2013.01); *B60W 30/16* (2013.01); *B60W 2050/0022* (2013.01); *B60W 30/095* (2013.01); *B60W 2550/143* (2013.01)
USPC .......................................... 701/532; 701/301

(58) Field of Classification Search
USPC .......................................... 701/200, 301, 532
See application file for complete search history.

(56) References Cited

U.S. PATENT DOCUMENTS 5,680,306 A * 10/1997 Shin et al. ........................ 701/23
5,913,376 A *  6/1999 Takei ............................. 180/168

(Continued)

FOREIGN PATENT DOCUMENTS

| DE | 197 38 764 | 3/1999 |
| DE | 199 21 449 | 1/2001 |

(Continued)

*Primary Examiner* — Imran Mustafa
(74) *Attorney, Agent, or Firm* — Kenyon & Kenyon LLP

(57) ABSTRACT

In a method for course prediction in driver assistance systems for motor vehicles, a dynamic course hypothesis is created on the basis of vehicle-dynamics data of the vehicle, which method includes the following steps:
  creating an infrastructure course hypothesis on the basis of data from at least one information source that describe the traffic infrastructure;
  calculating, on the basis of features of the information source, a weighting factor that describes the reliability of the infrastructure course hypothesis; and
  fusing the infrastructure course hypothesis with the dynamic course hypothesis, with weighting in accordance with the calculated weighting factor, to produce a definitive course hypothesis.

11 Claims, 3 Drawing Sheets

(56) References Cited

U.S. PATENT DOCUMENTS

| | | | |
|---|---|---|---|
| 6,470,272 B2 * | 10/2002 | Cong et al. | 701/301 |
| 2002/0121989 A1 | 9/2002 | Burns | |
| 2003/0116373 A1 | 6/2003 | Miller et al. | |

FOREIGN PATENT DOCUMENTS

| | | |
|---|---|---|
| EP | 0 313 223 | 4/1989 |
| WO | WO 01/95141 | 12/2001 |

* cited by examiner

METHOD FOR COURSE PREDICTION IN DRIVER ASSISTANCE SYSTEMS FOR MOTOR VEHICLES

BACKGROUND OF THE INVENTION

1. Field of the Invention

The present invention relates to a method for course prediction in driver assistance systems for motor vehicles, in which method a dynamic course hypothesis is created on the basis of vehicle-dynamics data of the vehicle.

2. Description of Related Art

In driver assistance systems that assist the driver in driving the vehicle and/or warn him or her of acute hazards, initiate automatic actions to avert a collision hazard, or activate safety systems to prepare for the collision, it is often necessary to predict the anticipated course of the host vehicle. A typical example of a driver assistance system of this kind is a dynamic vehicle speed controller (adaptive cruise control, ACC), with which the speed of the host vehicle is automatically adjusted to the speed of a preceding vehicle that is localized with the aid of a radar or lidar system. The course prediction is then used principally to decide whether a sensed object is to be selected as a target object for distance regulation, or whether that object is an irrelevant object, for example a vehicle in an adjacent lane.

ACC systems of this kind are already successfully in use, but the field of application is so far limited mostly to driving on expressways or on well-constructed main roads. In these situations it is generally possible to limit the analysis of the traffic environment to moving targets, for example preceding vehicles, while stationary targets, for example immovable objects at the roadside, can be ignored. In such systems, it is primarily the present vehicle speed and the yaw rate of the host vehicle that are employed to predict the host-vehicle course. Based on these data, a course hypothesis is created by mathematically describing the centerline of the anticipated course as a parabola whose curvature is defined by the ratio between yaw rate and vehicle speed. This course hypothesis obtained from vehicle-dynamics data will be referred to here as a "dynamic course hypothesis."

Efforts are being made to expand the applicability of ACC systems to other traffic situations, e.g., to stop-and-go situations on expressways, to driving on main roads, and ultimately also to driving in city traffic. In these situations, in which stationary targets generally must also be considered and the selection of valid target objects and the recognition of obstacles is thus substantially more complex, greater demands are also made in terms of course prediction accuracy.

It has already been proposed also to employ data from other information sources for the course prediction, for example the collective motion of other vehicles that can be sensed with the aid of the radar system, data from a navigation system, position data of stationary targets at the roadside, or even information supplied from a mono or stereo video system. Incorporation of this additional information into the course prediction has hitherto been based, however, on a rather casuistic approach, and improves the course prediction, if at all, in specific narrowly limited situations. The course prediction accuracy and reliability achievable in this fashion is therefore not sufficient for advanced driver assistance systems.

BRIEF SUMMARY OF THE INVENTION

The present invention offers the advantage of making possible, by way of a systematic integration of information from multiple available information sources, a more accurate and more reliable course prediction.

This is achieved, according to the present invention, by the following method steps:

creating an infrastructure course hypothesis on the basis of data from at least one information source that describe the traffic infrastructure;

calculating, on the basis of features of the information source, a weighting factor that describes the reliability of the infrastructure course hypothesis; and fusing the infrastructure course hypothesis with the dynamic course hypothesis, with weighting in accordance with the calculated weighting factor, to produce a definitive course hypothesis.

Suitable information sources for the infrastructure data are, for example, the radar system present in any case in an ACC system, a navigation system, and/or a mono or stereo video system. The infrastructure data can be extracted, for example, from, trajectories of other vehicles tracked with the aid of the radar system; stationary targets at the roadside, such as guard rails and the like, that can likewise be localized by the radar system; data made available by the navigation system regarding the course of the roadway; and/or the layout of roadway markings or other road delimitations, such as curbs and the like, detected with the aid of the video system.

From these infrastructure data, at least one infrastructure course hypothesis is generated that describes a course of the host vehicle that is possible based on the roadway geometry, for example in the form of a line sequence that extends at the center of the driving track anticipated to be traveled by the vehicle.

Because of measurement inaccuracies or limited resolution of the information sources used, and because of uncertainties in the interpretation of the infrastructure data, the course hypothesis generated in this fashion has only a limited reliability, which can be estimated for each information source or combination of information sources based on the known properties in that information source and/or on its present status. This estimate is effected using a suitable algorithm that produces, from the features of the information source, a weighting factor that increases in proportion to the reliability of the data.

In order to create a definitive course hypothesis that approaches as closely as possible the actual expected course progression, the dynamic course hypothesis and the infrastructure course hypothesis are fused by producing a weighted combination of these two course hypotheses. The result of this is that all the available information is appropriately incorporated into the definitive course hypothesis. In particular, the course prediction becomes highly robust, since momentary, situation-dependent weaknesses of one or another data source can be compensated for by greater weighting of the other data source.

The line sequence that indicates the dynamic course hypothesis may be represented by a polynomial or multiple continuously mutually adjacent polynomial segments in a suitable coordinate system, for example in the form of third-order polynomials, and the infrastructure course hypothesis is represented, in the same coordinate system, by a polynomial or corresponding polynomial segments of the same form, i.e., once again by third-order polynomials. This allows easy fusion by producing a respective weighted sum from the mutually corresponding coefficients of the polynomials.

Because the dynamic course hypothesis loses value and reliability with increasing distance from the host vehicle, it may be useful to shift the weights more strongly toward the infrastructure course hypothesis with increasing distance.

If multiple different information sources are used to create the infrastructure course hypothesis, it is useful to correlate the data from the various sources with one another and adjust them to each other, which not only enhances accuracy but also allows a more realistic estimate of the weighting factor, since a high level of consistency in the data from different sources implies high reliability. According to an example embodiment, a provisional course hypothesis can be produced from the infrastructure data of each individual information source, and this hypothesis is then fused, by analogy with the method described above, to yield the infrastructure course hypothesis. Here as well, the reliability of the various information sources can be accounted for by way of corresponding weighting factors.

Because an unequivocal infrastructure course hypothesis cannot be created, for example, at intersections, Y-junctions, and the like, it is useful firstly to create multiple infrastructure course hypotheses that each correspond to a possible route of travel. For selection of the most probable course hypothesis that is then to be fused with the dynamic course hypothesis, it is then often possible to draw upon a variety of different additional data, for example the fact that the directional indicator (turn signal) is active or, if a navigation system is present and if destination guidance is active, information about the route of travel calculated by the destination guidance system. A further useful criterion for this selection, and one that is practically always available, is the similarity of the infrastructure course hypothesis to the dynamic course hypothesis, since with increasing proximity to a Y-junction or the like, the dynamic course hypothesis will sooner or later reveal the driver's tendency toward one or the other route of travel.

DETAILED DESCRIPTION OF THE INVENTION

Figure 1:
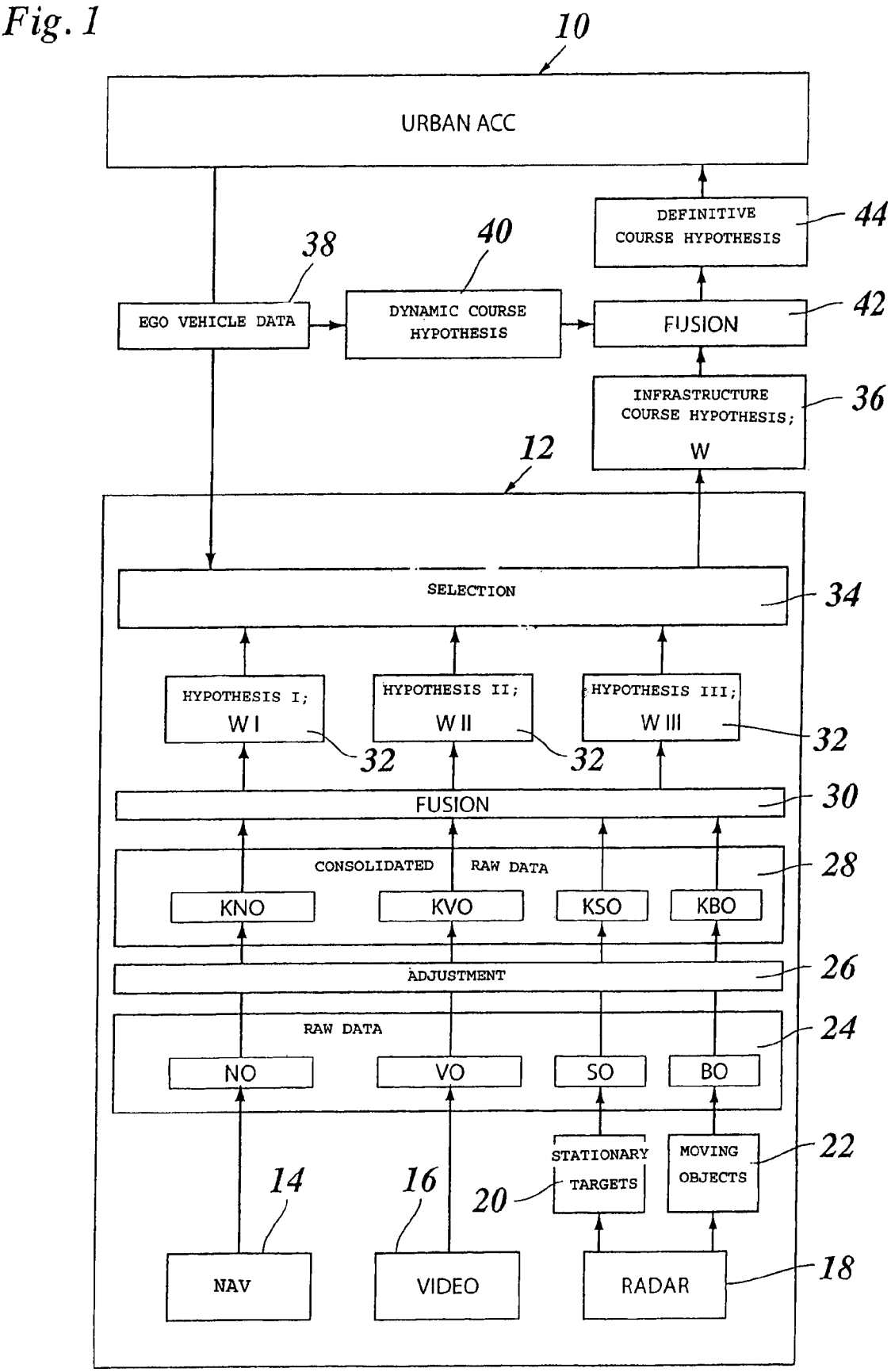
FIG. 1 is a block diagram to illustrate the method according to the present invention.

FIG. 1 shows, as an example of a driver assistance system, an ACC system 10 that is labeled "URBAN ACC" here to indicate that the system is intended also to be suitable for city traffic. ACC system 10 is constituted in known fashion by one or more microcomputers and associated software, and is therefore depicted only in simplified fashion as a block. The associated sensor equipment is also not shown further in FIG. 1. Only those functions of the system that refer to course prediction are picked out as a separate block 12.

In the example shown, the information sources available for course prediction are, in addition to vehicle-dynamics data, the following: a navigation system 14, a video system 16, and a radar system 18 that also supplies the data for spacing control in the context of the ACC function. Radar system 18 localizes both stationary targets 20 and movable objects 22. The corresponding position data are evaluated in different ways, so that the stationary targets and moving objects can be treated here as different information sources.

From the total of four information sources, raw data 24 are extracted. These raw data 24 are represented mathematically as geometric objects in a uniform two-dimensional coordinate system. These objects are labeled NO, VO, SO, BO, depending on the information source. In a method step 26 labeled "Adjustment," the raw data are adjusted to one another and preferably also to data of the same type already sensed earlier, in order to identify any contradictions or implausible jumps and eliminate them to the extent possible, and to correct inaccuracies resulting from the nature of the respective information source. This yields consolidated raw data 28, labeled KNO, KVO, KSO, and KBO. The data are also interpreted, and allocated to real physical objects.

In a "Fusion" step 30, the raw data for objects corresponding to one another are then combined by generating, from the parameters and coefficients that describe the individual objects, new synthetic objects that each correspond to a possible course hypothesis 32. In the example shown, three provisional course hypotheses I-III are created.

From these, in a "Selection" step 34, the hypothesis that is most probable in the particular situation is selected as infrastructure course hypothesis 36. The selection is made on the basis of data 38 ("Ego V Data") that refer to the host vehicle (ego vehicle). Examples of these data are the yaw rate or steering input, or comparable dynamic data that indicate the driver's tendency to select one or the other course, as well as additional data about activation of the directional indicator (turn signal) and, if the destination guidance function of navigation system 14 is active, data about the calculated route of travel.

In a calculation step 40, a dynamic course hypothesis is also calculated in known fashion from dynamic data 38. In a further fusion step 42, this dynamic course hypothesis 40 is then fused with the selected infrastructure course hypothesis 36 to yield a definitive course hypothesis 44 that is transmitted to ACC system 10.

Figure 2:
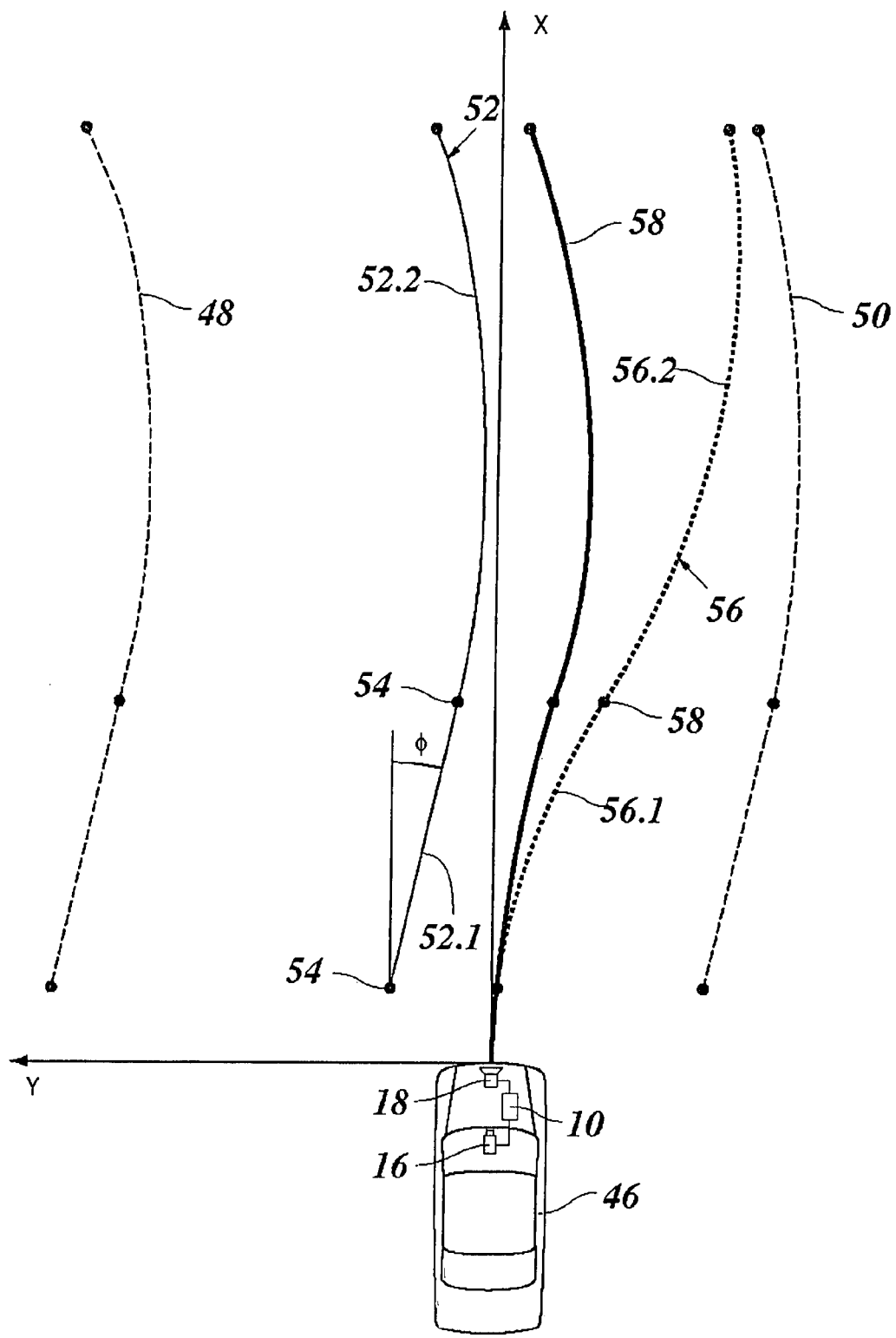
FIG. 2 is a diagram to explain a description system for course hypotheses utilized in the method according to the present invention.

FIG. 2 symbolically depicts "ego vehicle" 46, which is equipped with ACC system 10 (including block 12 and navigation system 14) and with video system 16 and radar system 18. Also shown is a two-dimensional Cartesian coordinate system X-Y that serves for mathematical description of the geometrical objects extracted as raw data, and of the course hypotheses. The origin of this coordinate system is constituted by the front of ego vehicle 46. The X axis extends in the direction of the present longitudinal axis of the vehicle, and the Y axis extends perpendicular thereto and parallel to the roadway surface.

Also shown in FIG. 2 are two line sequences 48 and 50 that represent, for example, the left and right boundaries of the driving lane, detected with the aid of video system 16 on the basis of marking lines, being traveled by ego vehicle 46. Fusion of these line sequences yields a centerline 52 that indicates the course of the track that the vehicle will follow. This centerline can thus be regarded as a representative of infrastructure course hypothesis 36. Centerline 52 could also, however, be the result of a fusion of a larger number of line sequences, some of which might also be derived from data of the navigation system or of the radar system.

A uniform description system is used to represent centerline 52 and all the other line objects, namely a description by way of line segments (e.g. 52.1, 52.2) that are delimited by anchor points 54. The line segments are in turn represented by polynomials of the form:

$$Y = Y_0 + \tan(\Phi)*(X-X_0) + (1/2)*k*(X-X_0)^2 + (1/6)*dk*(X-X_0)^3$$

in which $X_0$ is the X coordinate of anchor point 54 located closer to the Y axis, $\Phi$ is the angle formed by the tangent at that anchor point with the X axis, and coefficients k and dk indicate the line curvature or spatial change in the line curvature.

In order also to incorporate the width B of the driving track corresponding to the course hypothesis, the following polynomial representation can be used:

$$Y = Y_0 + (B/2) + \tan(\Phi)*(X-X_0) + (1/2)*k*(X-X_0)^2 + (1/6)*dk*(X-X_0)^3$$

A line sequence 56 in FIG. 2 analogously represents dynamic course hypothesis 40. Line sequence 56 is, per se, the graph of a single polynomial whose coefficients are determined by the vehicle-dynamics data (yaw rate and its derivative). In order to facilitate fusion with centerline 52, however, line sequence 56 is also subdivided by anchor points 58 into line segments 56.1, 56.2, anchor points 58 having the same X coordinates as anchor points 54. Expansion of the polynomial about anchor points 58 yields polynomial representations for line segments 56.1 and 56.2.

Centerline 52 can then easily be fused with line sequence 56 in step 42 in FIG. 1 by creating, in the polynomial representations for the mutually corresponding line segments, a weighted sum of the mutually corresponding coefficients. For example, if $k_d$ is a coefficient in the polynomial for the dynamic course hypothesis, and $k_i$ is the corresponding coefficient in the polynomial for the infrastructure course hypothesis, the coefficient k for the fused polynomial is obtained using the formula $$k = k_d*(1-W) + k_i*W$$

in which W is a weighting factor. This weighting factor is obtained as follows: In adjustment step 26 in FIG. 1, firstly a weighting factor that indicates the reliability of each information source is identified or calculated separately for the relevant information source. For example, the weighting factor for the navigation system can be dependent on the resolution of the digital map of that navigation system. The weighting factors for the video system and the radar system are correspondingly dependent on the accuracy of the raw data supplied by those systems, e.g., in consideration of the stability of the data received in the past. The plausibility or probable correctness of the interpretation of those data as real objects should also be incorporated into the weighting factors.

These weighting factors can also be used for weighting in the context of the fusion in step 30, and in that fusion step are furthermore combined into an overall weighting factor for the corresponding course hypothesis. This overall weighting factor can moreover be increased if the result of the adjustment is that the raw data show very good agreement when fused with one another; and it can be decreased in proportion to discrepancies that occur among the raw data. The overall weighting factor can be different for the various course hypotheses 32, depending on the information that was incorporated into the relevant course hypothesis upon fusion. A weighting factor (W I, W II, W III) is therefore obtained for each course hypothesis. Weighting factor W is then particular one of these weighting factors that belongs to the course hypothesis selected in step 34.

It is additionally possible to use, in fusion step 42, different weighting factors for the various pairs of line segments. To take into account the circumstance that the dynamic course hypothesis becomes less reliable with increasing distance, one might, for example, select a larger weighting factor, for example, for the fusion of line segments 52.2 and 56.2 than for line segments 52.1 and 56.1, so that the infrastructure course hypothesis acquires a greater weight.

As a new route segment comes into the field of view of the sensors as ego vehicle 46 continues to travel, a new infrastructure course hypothesis and a new dynamic course hypothesis are created for the new route segment. The above-described fusion procedure, preferably with weighting factors that differ in part, can then also be utilized to transition continuously from the old course hypothesis to the new one.

In a modified embodiment, it is also possible to assign a separate weighting factor to the dynamic course hypothesis and to vary that factor as a function of the stability or reliability of the dynamic course hypothesis. For example, the weight of the dynamic course hypothesis can be reduced if the driver has approached the right or left roadway boundary due to inattention, and then executes a relatively abrupt steering maneuver in order to correct.

Figure 3:
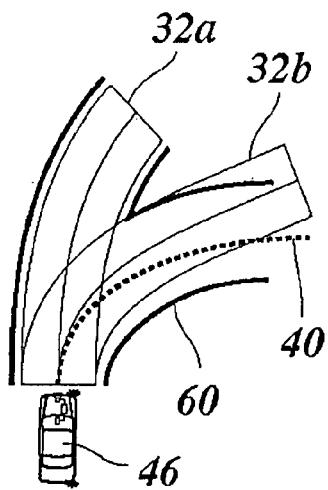
FIGS. 3 to 10 show various situation examples to explain the manner of operation of the method according to the present invention.
Figure 4:
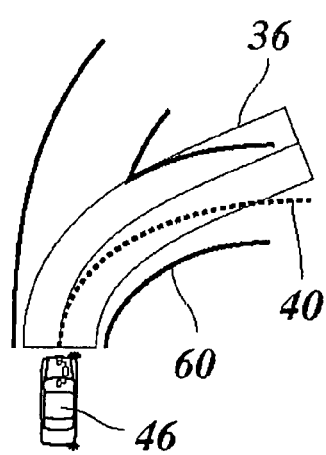
Figure 5:
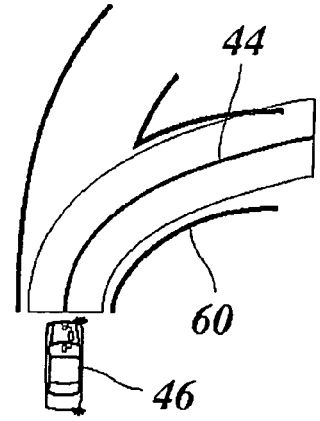

FIGS. 3 to 5 illustrate, using the example of a hypothetical traffic situation, the generation of two course hypotheses based on the infrastructure data, the selection of infrastructure course hypothesis 36 on the basis of the dynamic data, and fusion with the dynamic course hypothesis. Low-pass filtering of the course hypotheses is also advisable.

The generation and selection of the infrastructure course hypothesis, and fusion thereof with the dynamic course hypothesis, are illustrated in FIGS. 3 to 5 using a situational example.

In FIG. 3, ego vehicle 46 is approaching a curved Y-junction 60. Two course hypotheses 32a, 32b are accordingly generated for the routes that can be selected. The corresponding driving tracks, and their centerlines, are depicted. It is apparent that because of measurement or interpretation errors, course hypothesis 32b deviates from the actual course of the road. Dynamic course hypothesis 40 is plotted as a dashed line. The right turn signal of ego vehicle 46 is active. Because dynamic course hypothesis 40 also suggests a turn to the right, hypothesis 32b is selected as the infrastructure course hypothesis (FIG. 4). FIG. 5 then shows the definitive course hypothesis 36, obtained by fusion, that is better adapted to the actual course of the road.

FIGS. 6 to 10 illustrate, using examples, the manner in which the dynamic data (represented here by dynamic course hypothesis 40) influence selection of the infrastructure course hypothesis. Of the two course hypotheses 32a, 32b, the one that is selected as the infrastructure course hypothesis is drawn in each case as a bold line.

Figure 6:
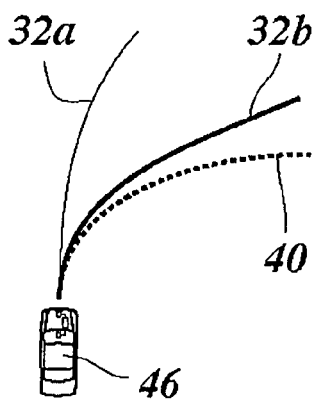

In FIG. 6, course hypothesis 32b is selected because its conforms better to dynamic course hypothesis 40.

Figure 7:
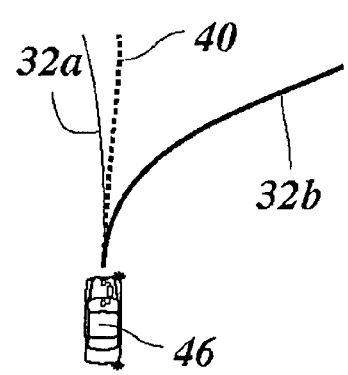

In FIG. 7, course hypothesis 32b is selected even though it conforms more poorly to dynamic course hypothesis 40 than does the alternative course hypothesis 32a, because the right turn signal of ego vehicle 46 is active.

Figure 8:
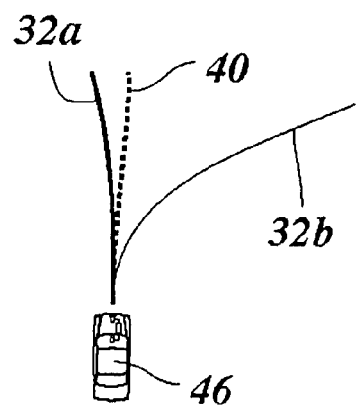

In FIG. 8, in the same situation, the right turn signal is not active and therefore course hypothesis 32a is selected here.

Figure 9:
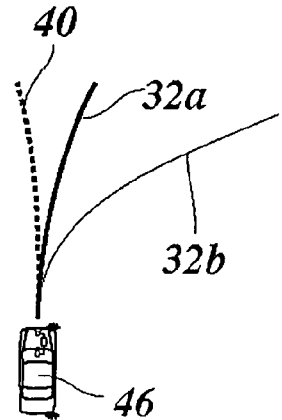

In FIG. 9, the right turn signal is active but both course hypotheses 32a and 32b are compatible with the assumption that the driver wishes to turn right. Because dynamic course hypothesis 40 is more suggestive of straight-line travel or a curve to the left, course hypothesis 32a, which veers less sharply to the right, is selected.

Figure 10:
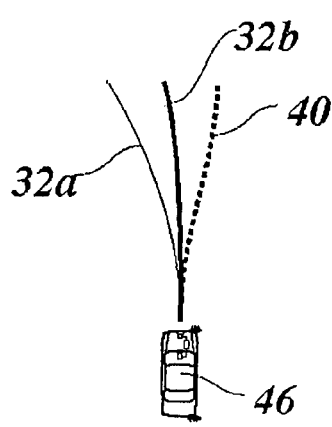

In FIG. 10, the right turn signal is active but the two course hypotheses 32a and 32b do not indicate any possibility of a right turn. Course hypothesis 32b, which conforms better to dynamic course hypothesis 40, is therefore selected.

What is claimed is:

1. A method for providing a course prediction in a driver assistance system of a motor vehicle, comprising:

generating, by the driver assistance system, a dynamic course hypothesis for the vehicle on the basis of vehicle-dynamics data of the vehicle;

generating, by the driver assistance system, an infrastructure course hypothesis for the vehicle on the basis of data from at least one information source that describe a traffic infrastructure;

calculating, by the driver assistance system, on the basis of features of the at least one information source, a weighting factor that describes the reliability of the infrastructure course hypothesis; and fusing the infrastructure course hypothesis with the dynamic course hypothesis, with weighting in accordance with the calculated weighting factor, to produce a definitive course hypothesis transmitting the definitive course hypothesis to an adaptive cruise control system.

2. The method as recited in claim 1, wherein the at least one information source includes at least one of a radar system, a lidar system, a video system, and a navigation system.

3. The method as recited in claim 2, wherein the infrastructure course hypothesis is generated by combining data from multiple information sources, and wherein the data from multiple information sources are adjusted to one another and checked for plausibility, and wherein the weighting factor is varied as a function of the result of at least one of the adjustment and the plausibility check.

4. The method as recited in claim 3, wherein a separate weighting factor is allocated to each of the data from the multiple information sources, the separate weighting factor indicating at least one of the reliability and plausibility of the corresponding data, and wherein the infrastructure course hypothesis is created by fusion of the data from the multiple information sources, weighted with the respective weighting factors, and wherein the separate weighting factors are combined to generate the weighting factor used for fusion of the infrastructure course hypothesis with the dynamic course hypothesis.

5. The method as recited in claim 4, wherein the dynamic course hypothesis and the infrastructure course hypothesis are represented by polynomials of the same form.

6. The method as recited in claim 5, wherein the polynomials are third order polynomials.

7. The method as recited in claim 1, further comprising:

initially generating multiple course hypotheses on the basis of data from the at least one information source that describe the traffic infrastructure, wherein each of the multiple course hypotheses describes a course that is possible in light of the traffic infrastructure;

wherein one of the multiple course hypotheses is selected as the infrastructure course hypothesis based on additional information about one of detectable and presumable intentions of the driver.

8. The method as recited in claim 7, wherein the selection of the infrastructure course hypothesis is made as a function of vehicle-dynamics data of the vehicle.

9. The method as recited in claim 7, wherein the selection of the infrastructure course hypothesis is made as a function of at least one of the status of a travel-direction indicator and a route information of a navigation system.

10. The method as recited in claim 8, wherein the selection of the infrastructure course hypothesis is made as a function of at least one of the status of a travel-direction indicator and a route information of a navigation system.

11. A driver assistance system for a vehicle, comprising:

generating, using a microcomputer, a dynamic course hypothesis for the vehicle on the basis of vehicle-dynamics data of the vehicle;

generating, using a microcomputer an infrastructure course hypothesis for the vehicle on the basis of data from at least one information source that describe a traffic infrastructure;

calculating, using a microcomputer, on the basis of features of the at least one information source, a weighting factor that describes the reliability of the infrastructure course hypothesis; and fusing the infrastructure course hypothesis with the dynamic course hypothesis, with weighting in accordance with the calculated weighting factor, to produce a definitive course hypothesis transmitting the definitive course hypothesis to an adaptive cruise control system.

\* \* \* \* \*